W. LAMPERT & H. HUBER.
Bretzel-Machine.

No. 224,446.  Patented Feb. 10, 1880.

Witnesses.
A. Ruppert,
J. H. Lange.

William Lampert,
Henry Huber.
Inventors.
per Edson Brothers
Attorneys.

UNITED STATES PATENT OFFICE.

WILLIAM LAMPERT AND HENRY HUBER, OF CRESTLINE, ASSIGNORS OF ONE-HALF OF THEIR RIGHT TO BUTLER, EARHART & CO., OF COLUMBUS, OHIO.

BRETZEL-MACHINE.

SPECIFICATION forming part of Letters Patent No. 224,446, dated February 10, 1880.

Application filed March 3, 1879.

*To all whom it may concern:*

Be it known that we, WILLIAM LAMPERT and HENRY HUBER, of Crestline, in the county of Crawford and State of Ohio, have invented certain new and useful Improvements in Bretzel-Machines; and we do hereby declare that the following is a full, clear, and exact description of the invention, which will enable others skilled in the art to which it appertains to make and use the same, reference being had to the accompanying drawings, and to letters of reference marked thereon, which form a part of this specification, and in which—

Figure 1:
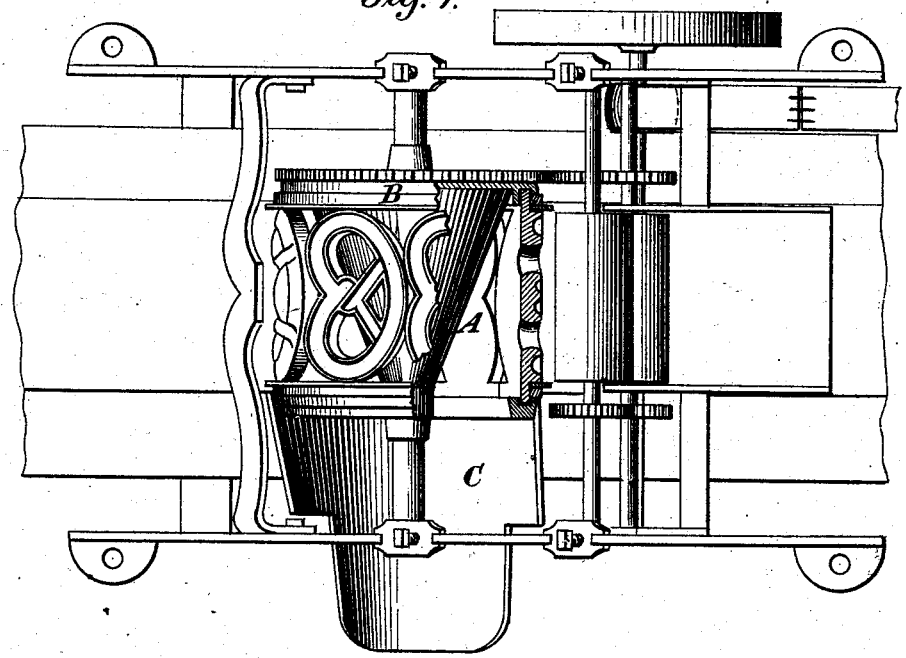
Figure 2:
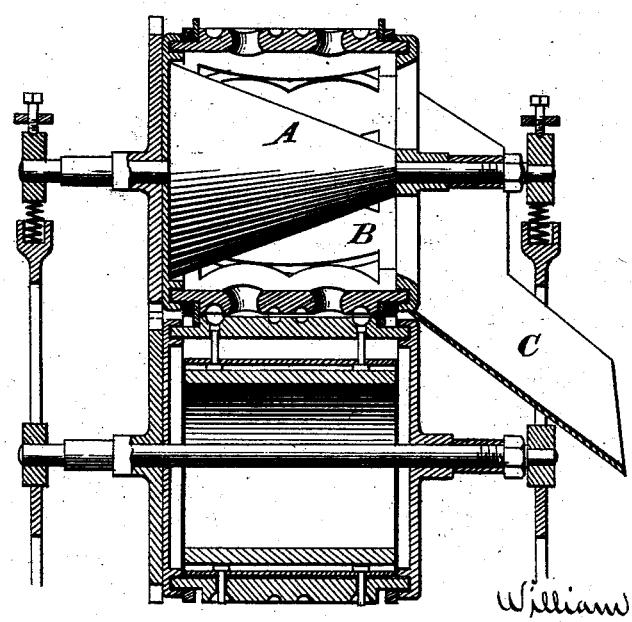

Figure 1 is a plan view, partially in section, of our improvement in bretzel-machines; and Fig. 2 is a vertical section of the same.

Corresponding parts in the two figures are denoted by like letters.

This invention relates to certain improvements in bretzel or jumble machines, the object of which is to provide for the discharging to one side of the scraps of dough resulting from the formation of the bretzel or jumble; and it consists in the arrangement or employment, within one of the bretzel or jumble die cylinders, of a cone, substantially as hereinafter more fully set forth.

In the accompanying drawings is illustrated a machine adapted for making bretzels or jumbles, consisting, essentially, of two cylinders or dies, arranged to revolve one with its periphery in contact with that of the other, and a delivering-apron. The dough is fed to and passed between these dies or cylinders from a dough-feeding trough and between two rollers adapted to control the thickness of the feeding of the dough, all of which is fully set forth in connection with a former invention for which application for Letters Patent has been made by us.

A marks a cone, arranged or located within the upper cylinder, B, one side of which is left open, the tapering end of which cone is disposed at the open side or end of the said cylinder, obviously to discharge the falling scraps of dough resulting from the formation of the jumble or bretzel between the dies of the two cylinders to one side of the machine.

C is a spout or chute, fastened to the supporting-frame of the cylinders or dies, with its elevated or upper end resting or arranged at the open end or side of the cylinder B. The scraps discharged by the cone A will fall upon the spout C, which will in turn deliver said scraps into a suitable receptacle, to be utilized, if desired.

This invention, in addition to being exceedingly simple and cheap, is also very convenient and desirable, and obviates the interference of the scraps with the working, or prevents the clogging of the machine, or rather its cylinders.

Having thus fully described our invention, we claim and desire to secure by Letters Patent—

1. In a jumble or bretzel machine, one of its cylinders or dies provided with a cone for discharging to one side scraps of dough resulting from the formation of the bretzel or jumble, substantially as specified.

2. The combination, with cylinder B of a bretzel or jumble machine, of the internal cone A, with its smaller end disposed at the open side or end of said cylinder, substantially as and for the purpose set forth.

In testimony that we claim the foregoing as our own we affix our signatures in presence of two witnesses.

WM. LAMPERT.
      HENRY HUBER.

Witnesses:
 AUGUST SCHOBER,
 JESSE WILLIAMS.